Patented Jan. 9, 1923.

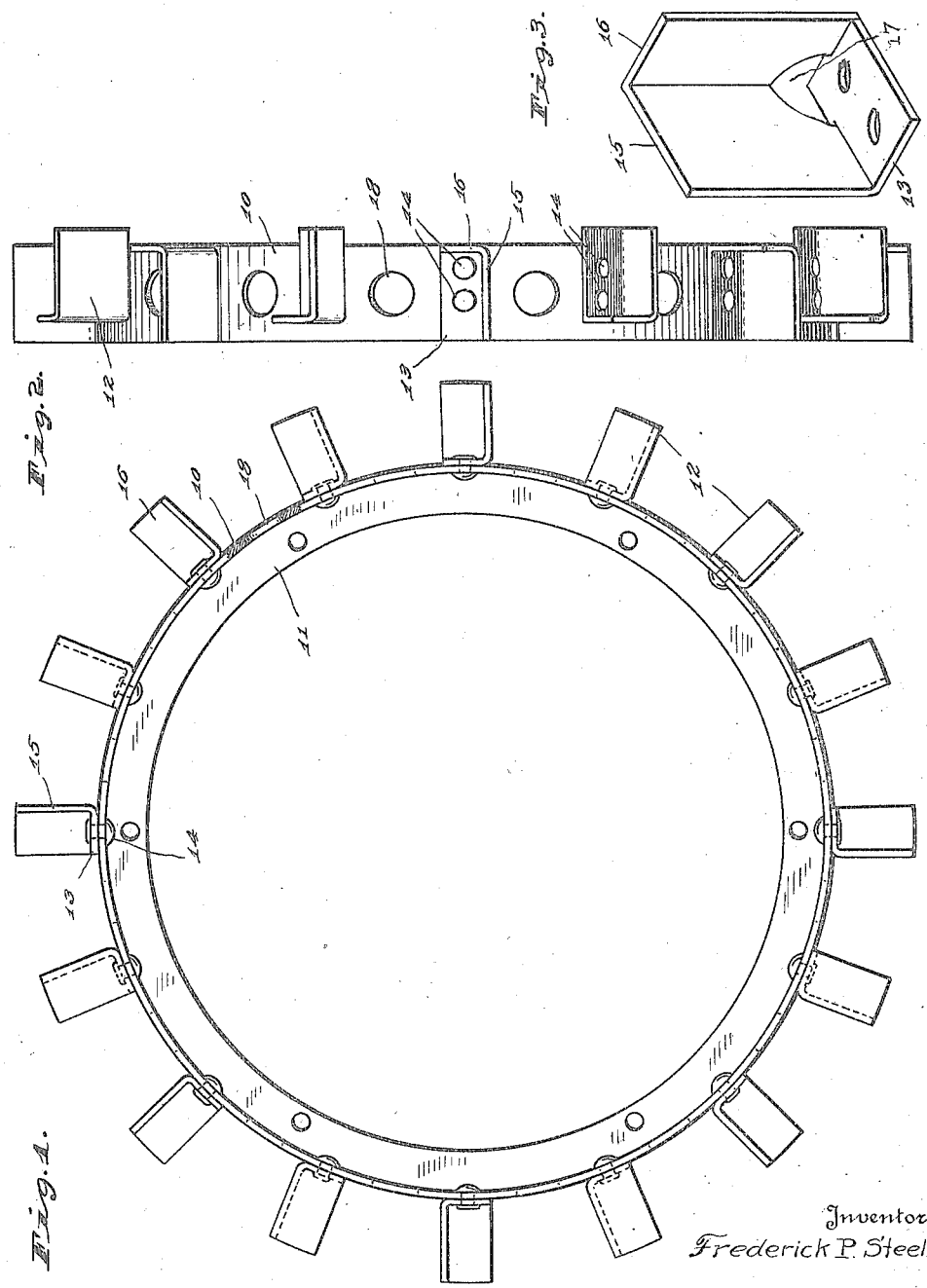

1,442,030

UNITED STATES PATENT OFFICE.

FREDERICK P. STEELE, OF INDIANAPOLIS, INDIANA, ASSIGNOR, BY MESNE ASSIGNMENTS, TO MIDWEST ENGINE CORPORATION, OF INDIANAPOLIS, INDIANA, A CORPORATION OF DELAWARE.

TRACTOR WHEEL RIM.

Application filed April 29, 1920. Serial No. 377,553.

*To all whom it may concern:*

Be it known that I, FREDERICK P. STEELE, a citizen of the United States, residing at Indianapolis, in the county of Marion and State of Indiana, have invented a new and useful Tractor Wheel Rim, of which the following is a specification.

It is the object of my present invention to provide a tractor rim construction, which for a minimum width of tread will give a maximum sustaining power and maximum traction.

It is well known that any tractor wheel or rim running on loose sand or soil will when acting as a driver cause such sand or soil to flow away from the rim, thus permitting the wheel to sink in to a comparatively great depth; so that in order for the wheel to run at all it must continuously attempt to climb out of the hole, thus in effect making a continuous up-hill pull. This requires an excess of power in order for the wheel to pull itself and the associated implement through the sand.

Many attempts to provide lugs and rims suitable for sandy soils have been failures because by increasing the width of the wheel to prevent sinking into the sand additional weight has been added, which causes more sinking; and the additional width has made harder the operation of the tractor in turning, on account of the twisting of the wheel in the soil.

If a rim were equipped with open-ended cans with their open ends outward, such cans would prevent the sand or soil caught within them from flowing out under the wheel; but while such a structure would have great sustaining power and great traction the cans would soon fill with caked sand and earth and the efficiency of the rim and the grouters would be very short-lived.

By my present invention, I get in a large measure the same benefits which could be obtained with such can construction, but avoid the caking feature.

In accomplishing this result, I make the grouters, in effect, as parts of cans, or as hollow cubes with the outer end and the forward end and one of the axial sides removed, so that each grouter comprises three sides of such a hollow cube, one side for attachment to the rim proper, one side parallel to the axis, and one side perpendicular to the axis. Alternate grouters are preferably arranged with their open axial ends cut away.

The accompanying drawing illustrates my invention: Fig. 1 is an end elevation of a tractor-wheel rim equipped with grouters according to my invention; Fig. 2 is an edge view of such rim; and Fig. 3 shows a detail of a modified grouter.

The wheel rim 10 is preferably provided with an inwardly projecting flange 11, which serves both to strengthen the rim and to provide an attaching means for demountably attaching the rim to a wheel; but this detail is not my invention.

Around the outside of the rim 10 are located my grouters 12, which are suitably riveted to the rim. Each of these grouters comprises three adjacent sides of a hollow cube or substantially rectangular prism, for equality of dimensions is not necessary. The side 13 bears against the rim 10, and is riveted thereto by the rivets 14; the side 15 is substantially parallel to the axis, and is substantially radial with respect to the rim, which side 15 is preferably the rear side of the grouter with reference to the normal direction of the rotation of the wheel; and the side 16 is substantially perpendicular to the axis of the wheel. The three sides 13, 15, and 16 are adjacent sides of the rectangular prism, and are rigid with one another, the other sides of such prism being open. The sides 16 of alternate grouters are at opposite axial ends of such grouters, as is clear from Fig. 2.

In operation, the grouters 12 serve very effectively to prevent the sand from running out from the grouters, by the action of the sides 16 of such grouters. Yet these grouters formed as open-sided hollow prisms open on three sides effectively serve to prevent caking of the sand or soil in the grouters. In order further to prevent such caking, especially in clay the corners of the sides 13, 15, and 16 where they all come together may be cut away, as shown in Fig. 3, to form an opening 17, which permits the clay or other soil to be pushed through sufficiently to insure that there will be no caking.

The wheel rim may be provided with radial holes 18 alternating with the grouters, in order further to prevent caking and to increase the traction.

I claim as my invention:

1. In a tractor wheel, the combination of a rim, and grouters mounted on said rim and each comprising outwardly projecting parts constituting two sides of a hollow substantially rectangular prism and with an open side opposite each of said two sides.

2. In a tractor wheel, the combination of a rim, and grouters mounted on said rim and each comprising outwardly projecting parts constituting two sides of a hollow (substantially rectangular) prism, alternate grouters being set on the rim so that the open sides thereof are in opposite directions axially of the wheel.

3. In a tractor wheel, the combination of a rim, and grouters attached to said rim, each of said grouters comprising a base side which is attached to the rim and two portions projecting outwardly from said base side to constitute adjacent sides of a hollow prism with the angle between said sides at least as great as a right angle.

4. In a tractor wheel, the combination of a rim, and grouters mounted on said rim and each comprising outwardly projecting parts constituting two sides of a hollow substantially rectangular prism, said sides having corner notches at the corners next to the rim at their abutting sides.

In witness whereof, I have hereunto set my hand at Indianapolis, Indiana, this 26th day of April, A. D. one thousand nine hundred and twenty.

FREDERICK P. STEELE.